UNITED STATES PATENT OFFICE.

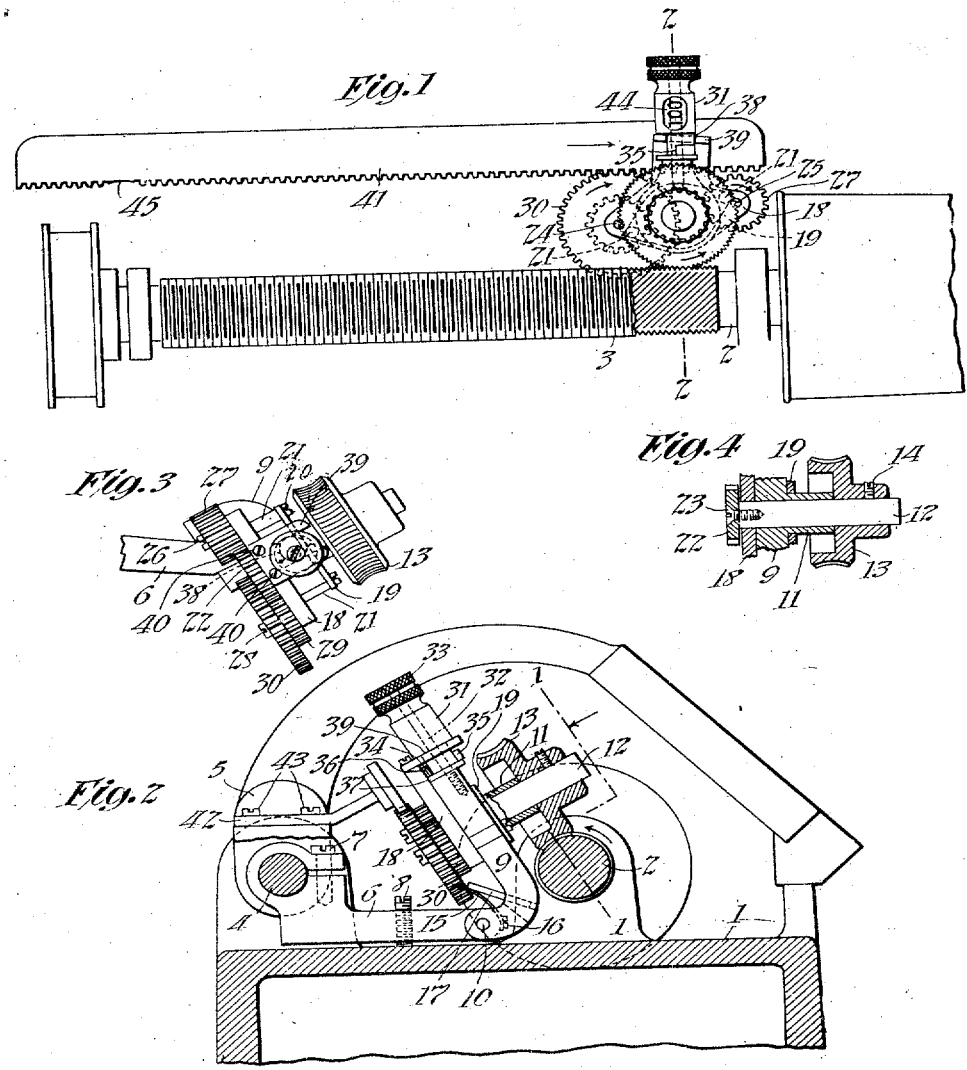

HERMAN WOLKE, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

936,269.     Specification of Letters Patent.     Patented Oct. 5, 1909.

Application filed March 24, 1908. Serial No. 422,876.

*To all whom it may concern:*

Be it known that I, HERMAN WOLKE, a citizen of the United States, and a resident of Orange, in the county of Essex and State of New Jersey, have invented certain new and useful Improvements in Phonographs, of which the following is a description.

My invention relates to phonographs, and has for its object the provision of means whereby the traveling carriage which carries the reproducer or recorder, may be fed at either of two desired rates of speed, so as to adapt it to operate, for example, upon records having respectively one hundred and two hundred threads per inch, and said means are preferably designed so that they may be readily applied to phonographs of ordinary construction, such as are now in general use throughout this and other countries.

In order that the invention may be more fully understood, reference is hereby made to the accompanying drawing of which—

Figure 1 is a section on line 1—1 of Fig. 2, viewed in the direction indicated by the arrow; Fig. 2 is a section on line 2—2 of Fig. 1 showing my invention applied to a phonograph of well-known form; Fig. 3 is a detail view of the gears for feeding the traveling carriage as viewed in a direction at right angles to Fig. 2, and Fig. 4 is a sectional detail of the worm gear and adjacent parts.

The phonograph shown is of ordinary form and comprises a base or body 1 which supports the main shaft 2 formed with a feed screw 3, which is generally of fine pitch, such as 100 threads to the inch. The body 1 also carries the back rod 4, upon which the sound box carriage 5 is slidably mounted in the usual manner. There is an arm 6 which is removably applied to the back rod 4, being held by a clamping screw 7. A screw 8 is threaded in said arm so that its lower end rests upon the body 1 and affords an angular adjustment with respect to the back rod 4. A frame 9 is pivoted at 10 to the arm 6 and said frame is formed with a bearing 11 in which is journaled a shaft 12, to which a worm gear 13 is secured by the set screw 14, said worm gear meshing with the thread of the feed screw 3, and being held in yielding engagement therewith by the action of a spring 15 which is secured to the end of the arm 6 by the screw 16, and presses against a pin or abutment 17 secured to the frame 9.

There is an auxiliary frame composed of two plates 18 and 19, which are secured together by screws 20 threaded in posts 21 which are rigid with the plate 18, and against the ends of which the plate 19 is clamped by the said screws. The plate 18 oscillates upon the shaft 12 between the bearing 11 and a spur gear 22 which is secured to the end of the shaft 12 by a screw 23. The plate 18 is provided with a pair of pins or studs 24 and 25. Upon the pin 25 and secured by the screw 26 is rotatably mounted a spur gear 27 meshing with the gear 22, and upon the pin 24 and secured by the screw 28 is a pair of spur gears 29 and 30 secured together, the gear 29 meshing with the gear 22. The gears 22, 27 and 29 are preferably all of the same diameter and the gear 30 twice the diameter of said gears.

Means are provided for oscillating the plate 18, and as shown comprises a sleeve 31 rotatably mounted on a pin 32 which is threaded in the frame 9. One end of said sleeve is provided with a milled head 33 and the opposite end is cut away to form a pair of shoulders 34 and 35 which are adapted to abut against a pin 36 carried by a plate 37 secured to the frame 9, in order to limit the angular movement of the sleeve 31 in either direction. A cam surface or eccentric 38 is formed upon the sleeve 31, near its lower end, the same being situated between the arms of a yoke 39 which is secured to the plate 18 by screws 40. This eccentric bears against the arms of said yoke as the sleeve 31 is oscillated upon the pin 32 and thereby causes oscillation of the plate 18 upon its axis, which brings the gears 27 and 30 respectively into and out of engagement with a rack 41, which is secured to an arm 42, and which is in turn secured to the sound box carriage 5 by screws 43. This rack has a cutaway portion 45 near one end thereof of sufficient extent to effect a disengagement of the gear 27 with the rack when that point is reached, but which does not effect the engagement of the gear 30, owing to its greater diameter. Indicating figures 44 are preferably applied to the opposite sides of the sleeve 31 to designate the rate of feed of the sound box carriage.

The operation of the device is as follows: When the parts are in the positions shown in Figs. 1 and 2 the gear 30 is in engagement with the rack 41 and is rotated by the gears 22 and 29, by reason of the engagement of the worm gear 13 with the feed screw 3, and the carriage is fed forward at a rate which is equal to the pitch of the feed screw for each revolution thereof, or one one-hundredth of an inch. The indicia 44, which are visible at this time are the figures 100, which means that the rate of feed of the sound box carriage is suitable for operating upon records having one hundred threads per inch. When the sleeve 31 is rotated through an angle of 180° the figures 200 (not shown) will come into view, and at the same time the plate 18 will be oscillated to such an extent as to remove the gear 30 from engagement with the rack 41, and to bring into engagement with said rack the gear 27, which gear is driven by the gear 22 by reason of the engagement of the worm wheel 13 with the feed screw 3. In this position of the parts, the sound box carriage will be driven at a slower rate of speed than before and preferably at a rate which is equal to one half the pitch of the feed screw for each revolution thereof, so as to adapt the sound box carriage to operate upon the records having two hundred threads to the inch, as indicated by the figures upon the sleeve 31. It is obvious that all that is necessary to do, in order to change the rate of feed of the sound box carriage is to rotate the sleeve 31 through an angle of 180°, so as to oscillate the plate 18, which movement does not affect in any way the position of the frame 9 or the worm wheel 13. The length and position of the rack 41 is such and the cut-away portion 45 is so situated that no matter whether the gear 27 or the gear 30 is feeding the carriage the rack 41 will be automatically disengaged from the feeding gear whenever the sound box reaches the end of the record surface.

Having now described my invention, what I claim is:

1. In a phonograph, the combination of the rotating feed screw and traveling carriage, a rack, a pair of gears movable one into and the other out of engagement with said rack, or vice versa, said rack and gears constituting coöperating members, one element of said members being carried by said carriage, and the other element being immovable in the direction of movement of said carriage, and means for operatively connecting said gears with said feed screw, substantially as set forth.

2. In a phonograph, the combination of the rotating feed screw and traveling carriage, a rack, a pair of gears movable into and out of engagement with said rack at different points along the length thereof, said rack or gears being immovable in the direction of movement of said carriage and the coöperating member or members moving with said carriage and means for operatively connecting said gears with said feed screw, substantially as set forth.

3. In a phonograph, the combination of the rotating feed screw and traveling carriage, a rack, a pair of gears of different diameters movable into and out of engagement therewith, said rack and gears constituting coöperating members, one element of said members being carried by said carriage, and the other element being immovable in the direction of movement of said carriage and means for operatively connecting said gears with said feed screw, substantially as set forth.

4. In a phonograph, the combination of a rotating feed screw and traveling carriage, a rack, a pair of gears movable into and out of engagement with said rack carried by said carriage at different points along the length thereof, said rack being cut-away near one end to a sufficient extent as to effect the disengagement of the smaller gear without affecting the engagement of the larger gear and means for operatively connecting said gears with said feed screw, substantially as set forth.

5. In a phonograph, the combination of the rotating feed screw and traveling carriage, a rack carried by said carriage, a pivotal support carrying a pair of rotatably mounted gears moved into and out of engagement with said rack when said support is turned on its pivot, and means concentric with the pivot of said support for operatively connecting said gears with said feed screw, substantially as set forth.

6. In a phonograph, the combination of the rotating feed screw and traveling carriage, a rack carried by said carriage, a pivotal support carrying a pair of rotatably mounted gears moved into and out of engagement with said rack when said support is turned on its pivot, means concentric with the pivot of said support for operatively connecting said gears with said feed screw, and means for oscillating said support, substantially as set forth.

7. In a phonograph, the combination of the rotating feed screw and traveling carriage, a rack carried by said carriage, a spring-pressed frame carrying a worm gear in engagement with said feed screw, an auxiliary frame applied to said spring-pressed frame and provided with a pair of spur gears adapted to be brought into and out of engagement with said rack, and a driving connection between said worm gear and said spur gears, substantially as set forth.

8. In a phonograph, the combination of the rotating feed screw and traveling carriage, a rack carried by said carriage, a spring pressed frame, a worm gear rotatably mounted thereon in engagement with said feed screw, an auxiliary frame pivotally connected to said spring pressed frame, a pair of spur gears rotatably mounted upon said pivotal frame, and a driving connection between said worm gear and said spur gears, substantially as set forth.

9. In a phonograph, the combination of the body, rotatable feed screw and traveling carriage, a support 6 removably secured to said body, a frame 9 hinged thereto, a worm gear rotatably mounted on said frame, a rack carried by said carriage, and means operatively connected with said worm gear for engaging said rack to feed the carriage, substantially as set forth.

10. In a phonograph, the combination with the rotating feed screw, back rod and carriage sleeved thereon, of an arm 6 sleeved on said back rod and provided with a screw 8 adapted to rest upon the body of the phonograph, a frame 9 pivoted to said arm, a worm gear rotatably mounted on said frame and adapted to engage said feed screw, and means secured to said carriage and operatively connected with said worm gear, substantially as set forth.

11. In a phonograph, the combination of the rotating feed screw and traveling carriage, a frame carrying a worm gear engaging said feed screw, an auxiliary frame movably connected to said frame, an oscillating sleeve applied to one of said frames and having a cam surface in engagement with the other frame, an abutment carried by said carriage, interchangeable means carried by said last named frame for engaging said abutment and connections between said worm gear and interchangeable means, substantially as set forth.

12. In a phonograph, the combination of the rotating feed screw and traveling carriage, a frame carrying a worm gear engaging said feed screw, an auxiliary frame movably connected to said main frame, an oscillating sleeve applied to one of said frames and having a cam surface in engagement with the other frame, connections between said worm gear and said carriage including interchangeable means carried by said last named frame and means for limiting the angular movement of said sleeve in both directions, substantially as set forth.

13. In a phonograph, the combination of the rotating feed screw and traveling carriage, a main frame carrying a worm gear engaging said feed screw, an auxiliary frame movably connected to said main frame, an oscillating sleeve applied to one of said frames and having a cam surface in engagement with the other frame, connections between said worm gear and said carriage including interchangeable means carried by said last named frame, said sleeve having indicia applied thereto for designating the rate of feed of the traveling carriage, substantially as set forth.

14. An attachment for phonographs comprising an arm 6 adapted to be secured to the back rod of the phonograph, a frame 9 pivoted to said arm, a worm gear rotatably mounted on said frame in such position as to engage the feed screw and a pair of spur gears operatively connected with said worm gear and movable with respect to said frame 9, substantially as set forth.

15. An attachment for phonographs, comprising a member 6 adapted to be fixed to the phonograph body, a frame 9 pivoted thereto, a worm gear rotatably mounted on said frame in such position as to engage the feed screw of the phonograph, a frame pivotally mounted on said frame 9 and carrying a pair of gears operatively connected with said worm gear, and means carried by said frame 9 for moving the said auxiliary frame, substantially as set forth.

This specification signed and witnessed this 23rd day of March 1908.

HERMAN WOLKE.

Witnesses:
FRANK D. LEWIS,
H. H. DYKE.

---

Correction in Letters Patent No. 936,269.

It is hereby certified that in Letters Patent No. 936,269, granted October 5, 1909, upon the application of Herman Wolke, of Orange, New Jersey, for an improvement in "Phonographs," an error appears in the printed specification requiring correction, as follows: Page 2, lines 84,-85, the words "carried by said carriage" should be stricken out and inserted after the word "rack," line 83, same page; and that the said Letters Patent should be read with this correction therein that the same may conform to the record of the case in the Patent Office.

Signed and sealed this 9th day of November, A. D., 1909.

[SEAL.]

E. B. MOORE,
*Commissioner of Patents.* feed screw, an auxiliary frame pivotally connected to said spring pressed frame, a pair of spur gears rotatably mounted upon said pivotal frame, and a driving connection between said worm gear and said spur gears, substantially as set forth.

9. In a phonograph, the combination of the body, rotatable feed screw and traveling carriage, a support 6 removably secured to said body, a frame 9 hinged thereto, a worm gear rotatably mounted on said frame, a rack carried by said carriage, and means operatively connected with said worm gear for engaging said rack to feed the carriage, substantially as set forth.

10. In a phonograph, the combination with the rotating feed screw, back rod and carriage sleeved thereon, of an arm 6 sleeved on said back rod and provided with a screw 8 adapted to rest upon the body of the phonograph, a frame 9 pivoted to said arm, a worm gear rotatably mounted on said frame and adapted to engage said feed screw, and means secured to said carriage and operatively connected with said worm gear, substantially as set forth.

11. In a phonograph, the combination of the rotating feed screw and traveling carriage, a frame carrying a worm gear engaging said feed screw, an auxiliary frame movably connected to said frame, an oscillating sleeve applied to one of said frames and having a cam surface in engagement with the other frame, an abutment carried by said carriage, interchangeable means carried by said last named frame for engaging said abutment and connections between said worm gear and interchangeable means, substantially as set forth.

12. In a phonograph, the combination of the rotating feed screw and traveling carriage, a frame carrying a worm gear engaging said feed screw, an auxiliary frame movably connected to said main frame, an oscillating sleeve applied to one of said frames and having a cam surface in engagement with the other frame, connections between said worm gear and said carriage including interchangeable means carried by said last named frame and means for limiting the angular movement of said sleeve in both directions, substantially as set forth.

13. In a phonograph, the combination of the rotating feed screw and traveling carriage, a main frame carrying a worm gear engaging said feed screw, an auxiliary frame movably connected to said main frame, an oscillating sleeve applied to one of said frames and having a cam surface in engagement with the other frame, connections between said worm gear and said carriage including interchangeable means carried by said last named frame, said sleeve having indicia applied thereto for designating the rate of feed of the traveling carriage, substantially as set forth.

14. An attachment for phonographs comprising an arm 6 adapted to be secured to the back rod of the phonograph, a frame 9 pivoted to said arm, a worm gear rotatably mounted on said frame in such position as to engage the feed screw and a pair of spur gears operatively connected with said worm gear and movable with respect to said frame 9, substantially as set forth.

15. An attachment for phonographs, comprising a member 6 adapted to be fixed to the phonograph body, a frame 9 pivoted thereto, a worm gear rotatably mounted on said frame in such position as to engage the feed screw of the phonograph, a frame pivotally mounted on said frame 9 and carrying a pair of gears operatively connected with said worm gear, and means carried by said frame 9 for moving the said auxiliary frame, substantially as set forth.

This specification signed and witnessed this 23rd day of March 1908.

HERMAN WOLKE.

Witnesses:
FRANK D. LEWIS,
H. H. DYKE.

---

Correction in Letters Patent No. 936,269.

It is hereby certified that in Letters Patent No. 936,269, granted October 5, 1909, upon the application of Herman Wolke, of Orange, New Jersey, for an improvement in "Phonographs," an error appears in the printed specification requiring correction, as follows: Page 2, lines 84-85, the words "carried by said carriage" should be stricken out and inserted after the word "rack," line 83, same page; and that the said Letters Patent should be read with this correction therein that the same may conform to the record of the case in the Patent Office.

Signed and sealed this 9th day of November, A. D., 1909.

[SEAL.]

E. B. MOORE,

*Commissioner of Patents.*

It is hereby certified that in Letters Patent No. 936,269, granted October 5, 1909, upon the application of Herman Wolke, of Orange, New Jersey, for an improvement in "Phonographs," an error appears in the printed specification requiring correction, as follows: Page 2, lines 84-85, the words "carried by said carriage" should be stricken out and inserted after the word "rack," line 83, same page; and that the said Letters Patent should be read with this correction therein that the same may conform to the record of the case in the Patent Office.

Signed and sealed this 9th day of November, A. D., 1909.

[SEAL.]

E. B. MOORE,

*Commissioner of Patents.*